(12) United States Patent
Pan et al.

(10) Patent No.: US 10,612,918 B2
(45) Date of Patent: Apr. 7, 2020

(54) MOBILE COMPUTING DEVICE AND METHOD FOR CALCULATING A BENDING ANGLE

(71) Applicant: Beijing Xiaomi Mobile Software Co., Ltd., Haidian District, Beijing (CN)

(72) Inventors: Shuangquan Pan, Beijing (CN); Guilin Zhong, Beijing (CN); Hui Du, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 255 days.

(21) Appl. No.: 15/636,037

(22) Filed: Jun. 28, 2017

(65) Prior Publication Data
US 2018/0031370 A1    Feb. 1, 2018

(30) Foreign Application Priority Data

Jul. 26, 2016    (CN) .......................... 2016 1 0596412

(51) Int. Cl.
*G01B 21/22*    (2006.01)
*G06F 1/16*     (2006.01)
*G01P 15/00*    (2006.01)

(52) U.S. Cl.
CPC .............. *G01B 21/22* (2013.01); *G01P 15/00* (2013.01); *G06F 1/1652* (2013.01)

(58) Field of Classification Search
CPC ................................................... G01B 21/22
See application file for complete search history.

(56) References Cited

U.S. PATENT DOCUMENTS

| 2013/0265262 | A1 | 10/2013 | Jung et al. |
| 2014/0029017 | A1* | 1/2014 | Lee ..................... G01B 11/24 |
| | | | 356/601 |
| 2014/0202014 | A1 | 7/2014 | Choi et al. |
| 2017/0016720 | A1 | 1/2017 | Choi et al. |
| 2017/0045996 | A1 | 2/2017 | Ka et al. |
| 2017/0052566 | A1 | 2/2017 | Ka et al. |

FOREIGN PATENT DOCUMENTS

| EP | 2648064 A2 | 10/2013 |
| EP | 2757439 A1 | 7/2014 |
| WO | 2015167299 A1 | 11/2015 |

OTHER PUBLICATIONS

Extended European Search Report issued in corresponding EP Application No. 17161626.1, dated May 16, 2017, 6 pages.

* cited by examiner

*Primary Examiner* — John E Breene
*Assistant Examiner* — Jeffrey C Morgan
(74) *Attorney, Agent, or Firm* — Arch & Lake LLP (57) ABSTRACT

The present disclosure relates to a mobile computing device and a method for calculating a bending angle and computer-readable medium, which belong to the field of electronic device. The mobile computing device includes: a flexible screen, at least two accelerometers, and a processing module; wherein the at least two accelerometers are located at different locations on the flexible screen, and each of the at least two accelerometers is connected to the processing module; the at least two accelerometers are configured to detect accelerations of the flexible screen; and the processing module is configured to calculate the bending angle of the flexible screen based on the accelerations detected by the at least two accelerometers, wherein the bending angle indicates how much the flexible screen is bent.

7 Claims, 4 Drawing Sheets accelerations of the flexible screen are detected by using the at least two accelerometers — 401 the bending angle of the flexible screen are calculated based on the accelerations detected by the at least two accelerometers, and the bending angle indicates how much the flexible screen is bent — 402

MOBILE COMPUTING DEVICE AND METHOD FOR CALCULATING A BENDING ANGLE

CROSS-REFERENCE TO RELATED APPLICATION

This application is based on and claims priority to Chinese Patent Application No. 201610596412.5 filed Jul. 26, 2016, which is incorporated herein by reference in its entirety.

TECHNICAL FIELD

The present disclosure relates to the field of electronic device, and more particularly to a mobile computer device with a flexible screen, a method for calculating a bending angle of a flexible screen, and a non-transitory computer-readable medium storing executable instructions for providing the method.

BACKGROUND

Intelligent mobile computing device is a term that is used generically to describe a mobile electronic system that has an independent operating system as well as an independent processor and memory. Software, including games, navigation and other applications, can be installed in memory and executed on the intelligent mobile computing device, and the computing device can also provide wireless network access through a mobile communication network. An intelligent mobile computing device is generally provided with a large display screen, which makes a full-screen touch operation possible, thus the way the user operates on the intelligent mobile computing device is far superior to the operation on a keyboard terminal.

With the rapid development of the intelligent mobile computing device, the concept "flexible screen" has emerged. The flexible screen does not only have a lighter and thinner size, but also a significantly reduced power consumption as compared with those of traditional display screen. Furthermore, the durability of the flexible screen has been greatly improved due to its bending and high flexibility characteristics.

SUMMARY

In view of the fact in related arts, the present disclosure provides a mobile computing device and a method for calculating a bending angle and computer-readable medium storing executable instructions for providing the method. The technical solutions are as follows.

According to a first aspect of embodiments in the present disclosure, a mobile computing device is provided. The mobile computing device includes: a flexible screen, at least two accelerometers, and a processing module; wherein the at least two accelerometers are located at different locations on the flexible screen, and each of the at least two accelerometers is connected to the processing module; the at least two accelerometers are configured to detect accelerations of the flexible screen; and the processing module is configured to calculate a bending angle of the flexible screen based on the accelerations detected by the at least two accelerometers, wherein the bending angle indicates how much the flexible screen is bent.

According to a second aspect of embodiments in the present disclosure, a method for calculating a bending angle is provided. The method is applied on a mobile computing device, and the mobile computing device includes at least a flexible screen and at least two accelerometers located at different positions on the flexible screen. The method includes: detecting accelerations of the flexible screen by using the at least two accelerometers; calculating the bending angle of the flexible screen based on the accelerations detected by the at least two accelerometers, wherein the bending angle indicates how much the flexible screen is bent.

According to a third aspect of embodiments in the present disclosure, a mobile computing device is provide, including: a detection module configured to detect accelerations of the flexible screen by using at least two accelerometers located at different positions on the flexible screen; and a processing module configured to calculate a bending angle of the flexible screen based on the accelerations detected by the at least two accelerometers, wherein the bending angle indicates how much the flexible screen is bent.

According to a fourth aspect of the embodiments in the present disclosure, a non-transitory computer readable medium is provided, the non-transitory computer readable medium storing program instructions for causing a processor to execute the steps of the method for calculating a bending angle according to the first aspect of the embodiments in the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

In order to gain a fuller understanding of the purpose, technical solutions and advantages of the present disclosure, the disclosure will be described in more detail below in conjunction with the embodiments and the accompanying drawings. Herein, the schematic implements of the present disclosure and their description are intended to interpret the present disclosure and are not to be construed as limiting the present disclosure.

The embodiments of the present disclosure provide a mobile computing device and a method for calculating a bending angle and computer-readable storage medium, which will be described in detail below in conjunction with the accompanying drawings.

Figure 1:
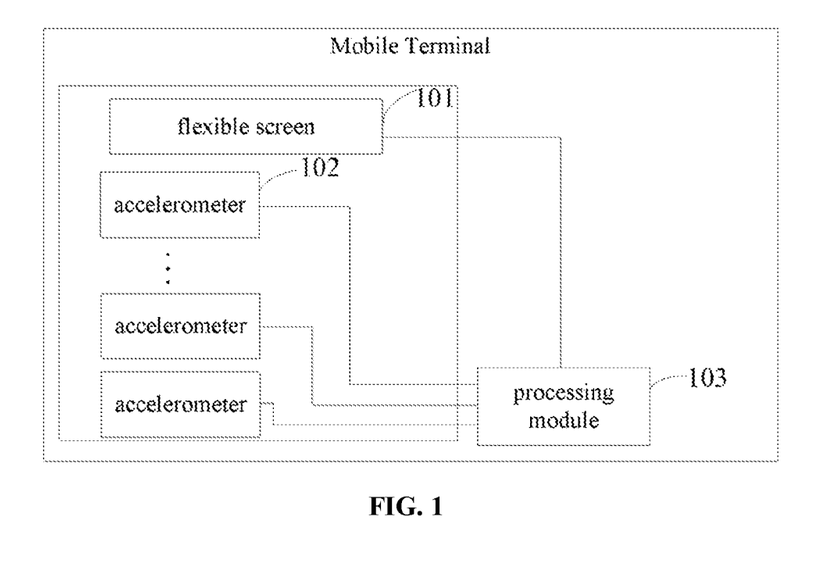
FIG. 1 is a schematic structural diagram illustrating a mobile computing device according to an exemplary embodiment.

FIG. 1 is a schematic structural diagram illustrating a mobile computing device according to an exemplary embodiment. As shown in FIG. 1, the mobile computing device includes at least: a flexible screen 101, at least two accelerometers 102, and a processing module 103. The at least two accelerometers 102 are located at different locations on the flexible screen 101 and each of the at least two accelerometers 102 is in communication with the processing module 103.

In the present embodiment, the accelerometer 102 is configured to detect acceleration, which is a vector with a magnitude and a direction. The operating principle of the accelerometer 102 is to establish a three-dimensional coordinate system including three specified directions. When acceleration is produced, the accelerometer 102 can detect acceleration components in three specified directions in the three-dimensional coordinate system. Then the acceleration may be calculated based on the acceleration components in three specified directions. Among the three specified directions, they all are not absolute directions, but directions determined by the accelerometer used as a benchmark. For example, the X-Y-Z coordinate system includes an X-axis direction, a Y-axis direction and a Z-axis direction. The X-axis direction and the Y-axis direction represent two mutually perpendicular directions on the plane where the accelerometer is located, and the Z-axis direction represents a direction perpendicular to the plane where the accelerometer is located. Hence when an attitude of the accelerometer changes, its X-axis direction, Y-axis direction and Z-axis direction also changes correspondingly.

In case that an accelerometer 102 is provided on the flexible screen 101, the acceleration detected by the accelerometer 102 is the acceleration of the flexible screen 101. Moreover, in case that at least two accelerometers 102 are provided on the flexible screen 101, and the at least two accelerometers 102 are located at different positions on the flexible screen 101, when the flexible screen 101 is bent, the at least two accelerometers 102 detect that directions of the at least two accelerations are different. A bending angle of the flexible screen 102 can be calculated based on a difference between the at least two accelerations.

Thus, the at least two accelerometers 102 detect accelerations on the flexible screen 101 and send them to the processing module 103. The processing module 103 calculates the bending angle of the flexible screen 101 based on the accelerations detected by the at least two accelerometers 102, wherein the bending angle indicates how much the flexible screen 101 is bent.

In order to ensure that the at least two accelerometers 102 can move together with the flexible screen 101 while the flexible screen 101 is moving, the at least two accelerometers 102 may be fixed at different positions inside of the flexible screen. In this way, the screen will not be blocked by the accelerometers, and in the meantime the accuracy in detecting acceleration can be guaranteed The processing module 103 is configured to perform calculations, and may include a central processor of the mobile computing device or a sensor hub configured for the mobile computing device, or other control units that have calculation capabilities, or any combination of local and remote processing units. The embodiment of the present invention is not limited hereto.

Once the bending angle has been calculated by the processing module 103, some control operations may be performed based on the current bending angle of the flexible screen 101, such as controlling to activate and deactivate the flexible screen 101 or controlling the flexible screen 101 to a display specific content, etc. The embodiment of the present invention does not limit the control operation.

The mobile computing device in the present embodiment provides an approach for calculating a bending angle of a flexible screen. By providing at least two accelerometers at different positions on the flexible screen, then detecting accelerations by at least two accelerometers and calculating the bending angle of the flexible screen by the processing module based on the detected accelerations, it can be easily to determine how much the flexible screen is bent, and upon which a control operation can be performed, which facilitates an easier operation.

In an alternative embodiment, in order to ensure that the calculated bending angle could accurately reflect how much the flexible screen 101 is bent, the at least two accelerometers 102 are offset a distance form one another selected to enable calculation of the angle. Therefore, the distance between any two of the at least two accelerometers 102 in the present embodiment is greater than a preset distance which may be determined by a mobile computing device developer by doing multiple tests or by other means. The embodiment of the present invention is not limited hereto. For example, the at least two accelerometers 102 may be located at opposite ends of the flexible screen 101, respectively.

In an alternative embodiment, when the flexible screen 101 is bent, the directions of the accelerations detected by the at least two accelerations 102 are different, and the vector components of the accelerations are in a specified direction. The bending angle of the flexible screen 102 can be calculated based on the vector components of accelerations.

Therefore, at least two accelerometers 102 can detect vector components of acceleration (hereafter also called acceleration components) of the flexible screen 101 in any one or more specified directions, and then the processing module 103 can calculate the bending angle of the flexible screen 101 based on the vector components of the acceleration detected by the at least two accelerometers 102.

Figure 2:
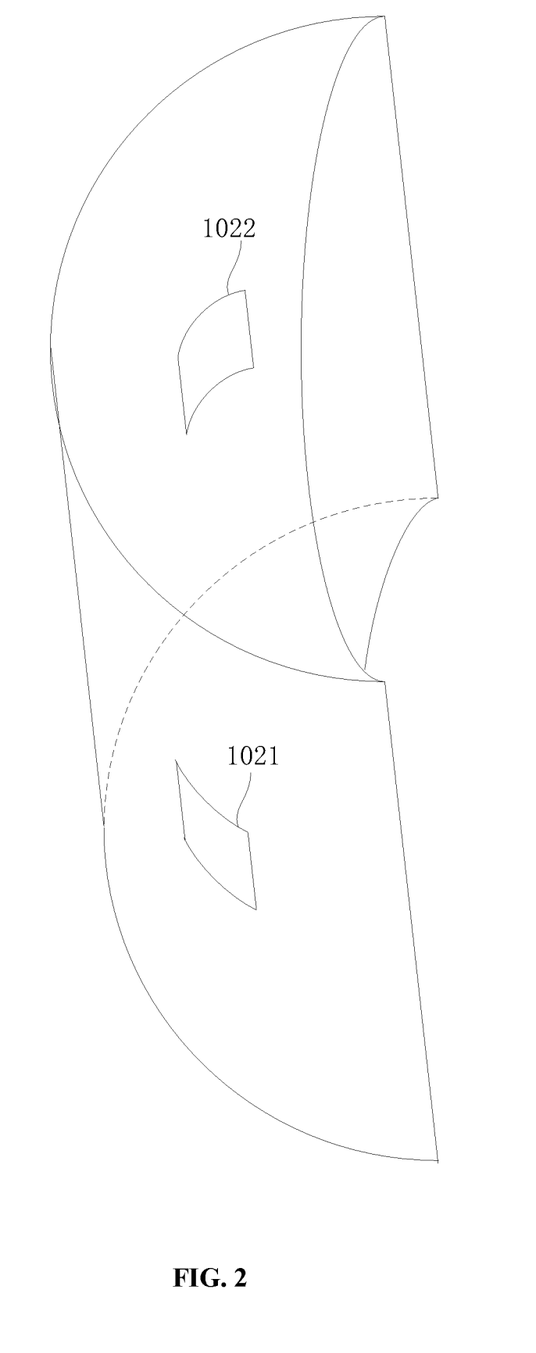
FIG. 2 is schematic diagram illustrating a mobile computing device shown in a bending state according to an exemplary embodiment.

For example, referring to FIG. 2, shown is a schematic diagram illustrating a mobile computing device in a bending state. Taking the at least two accelerometer 102 including a first accelerometer 1021 and a second accelerometer 1022 as an example, the first accelerometer 1021 is located on a first portion of the flexible screen, and the second accelerometer 1022 is located on a second portion of the flexible screen, wherein a certain angle is between the first portion of the flexible screen and the second portion of the flexible screen. The specified directions include an X-axis direction, a Y-axis direction, and a Z-axis direction, so that the first accelerometer and the second accelerometer may detect the vector components of the acceleration in X-axis direction, Y-axis direction, and Z-axis direction.

Figure 3:
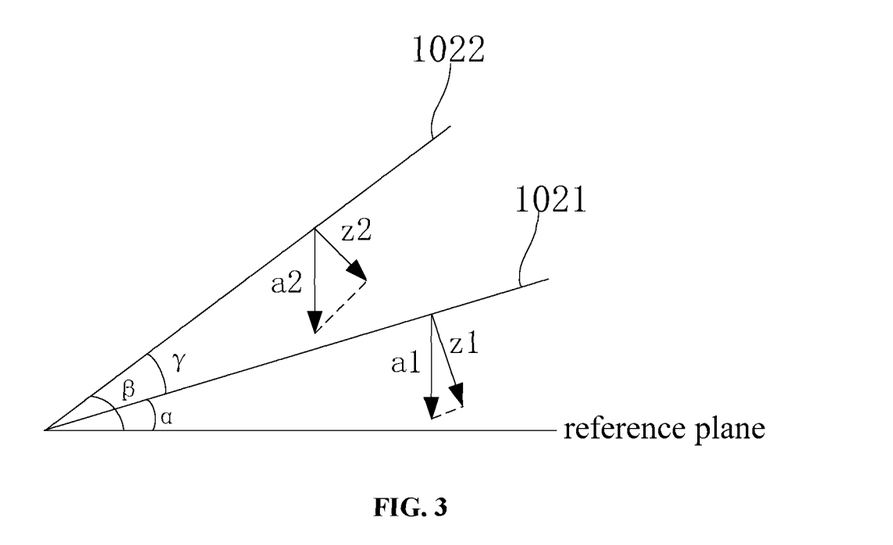
FIG. 3 is a schematic side view illustrating a flexible screen according to an exemplary embodiment.

A schematic side view of the flexible screen 101 (the top view of FIG. 2) is shown in FIG. 3, wherein a reference plane is a horizontal plane. The acceleration of the first accelerometer 1021 is denoted by a1, the acceleration component in X-axis direction of a1 is denoted by x1, the acceleration component in Y-axis direction of a1 is denoted by y1, and the acceleration component in Z-axis direction of a1 is denoted by z1, thus $a1=\sqrt{x1^2+y1^2z1^2}$. The acceleration of the second accelerometer 1021 is denoted by a2, the acceleration component in X-axis direction of a2 is denoted by x2, the acceleration component in Y-axis direction of a2 is denoted by y2, and the acceleration component in Z-axis direction of a2 is denoted by z2, thus $a2=\sqrt{x2^2+y2^2+z2^2}$. The angle γ between the first accelerometer 1021 and the second accelerometer 1022 may indicate the bending angle of the flexible screen.

$$\beta = \arccos\left(\frac{z2}{a2}\right) \text{ and } \alpha = \arccos\left(\frac{z1}{a1}\right),$$

$$\gamma = |\beta - \alpha| = \left|\arccos\left(\frac{z2}{\sqrt{x2^2 + y2^2 + z2^2}}\right) - \arccos\left(\frac{z1}{\sqrt{x1^2 + y1^2 + z1^2}}\right)\right|.$$

Since

That is to say, the processing module 103 may calculate the bending angle of the flexible screen 101 using the above-described formula.

When the mobile computing device is in a stationary state, the acceleration is approximately equal to the gravitational acceleration g. When the mobile computing device is in a motion state, it is usually in a uniform motion rather than moving more intensively. In this case the acceleration may be still considered to be equal to g. Thus, the processing module 103 does not need to calculate the acceleration of each accelerometer, and the default acceleration of the accelerometer may be g, in order to reduce the amount of calculation. Therefore, the first accelerometer 1021 and the second accelerometer 1022 only need to send the detected acceleration components in Z-axis direction to the processing module 103. Then, the processing module 103 calculates the bending angle of the flexible screen 101 based on the acceleration components in Z-axis direction detected by the first accelerometer 1021 and the second accelerometer 1022 by using the following formula: $\gamma = |\arccos(z2/g) - \arccos(z1/g)|$.

The formula above is only an example in which the mobile computing device includes two accelerometers. When the mobile computing device includes more than two accelerometers, the bending angle may be calculated in a similar way. For example, the processing module 103 may calculate a plurality of bending angles of the flexible screen 101 based on the acceleration components detected by any two of accelerometers by using the above-mentioned method, and average the plurality of bending angles to obtain an average value as an ultimately bending angle.

In the present embodiment, the processing module 103 may select a preset period as a cycle and calculate the bending angle of the flexible screen 101 based on the accelerations currently detected by the at least two accelerometers 102 every preset period. The preset period may be determined based on a sampling frequency of the accelerometer 102. The higher the sampling frequency is, correspondingly the shorter the preset period duration will be. The sampling frequency may be set to 100 Hz or other values, although the present disclosure is not limited hereto.

During the process of application, the processing module 103 may obtain a plurality of bending angles at different time instances. Then, the processing module 103 may calculate a bending speed of the flexible screen based on a change in the obtained bending angle.

In the present embodiment, the faster the bending angle changes, the faster the bending speed of the flexible screen 101 is. When the sampling frequency of the accelerometer 102 is fixed, the processing module 103 may calculate a difference between two successively obtained bending angles and regard the difference as the bending speed of the flexible screen 101. Alternatively, the quotient of the difference between two successively obtained bending speeds and the preset period may be regarded as the bending speed of the flexible screen 101. The present embodiment does not limit the manner how the bending speed is calculated.

Once the bending speed has been calculated by the processing module 103, some control operations may be performed based on the current bending speed of the flexible screen 101, such as controlling to activate and deactivate the flexible screen 101 or controlling the flexible screen 101 to display specific contents, etc. The embodiment of the present invention does not limit the control operation.

Figure 4:
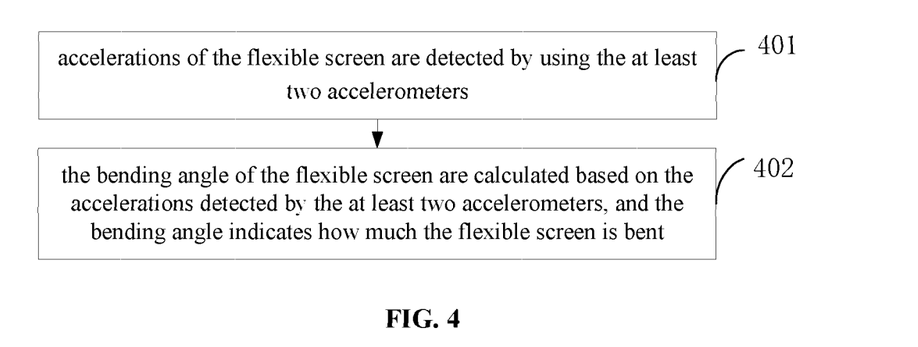
FIG. 4 is a flowchart illustrating a method for calculating a bending angle according to an exemplary embodiment.

FIG. 4 is a flowchart illustrating a method for calculating a bending angle according to an exemplary embodiment. As shown in FIG. 4, a method for calculating a bending angle is applied on a mobile computing device, and the mobile computing device includes at least a flexible screen and at least two accelerometers located at different positions on the flexible screen. The method includes the following steps:

At step 401, accelerations of the flexible screen are detected by using the at least two accelerometers.

At step 402, the bending angle of the flexible screen are calculated based on the accelerations detected by the at least two accelerometers, wherein the bending angle indicates how much the flexible screen is bent. The angle can be calculated, for example, using the equations described.

The method in the present embodiments provides an approach for calculating a bending angle of a flexible screen. By providing at least two accelerometers at different positions on the flexible screen, then detecting accelerations by at least two accelerometers and calculating the bending angle of the flexible screen by the processing module based on the detected acceleration vector components, the angle that the flexible screen is bent can be easily determined, and a control operation can be performed based on the calculated angle, which facilitates an easier operation.

In an alternative embodiment, the method further includes: detecting acceleration components of the flexible screen by using the at least two accelerometers; and calculating the bending angle of the flexible screen based on the acceleration components detected by the at least two accelerometers.

In an alternative embodiment, the at least two accelerometers includes a first accelerometer and a second accelerometer, and the specified directions include an X-axis direction, a Y-axis direction and a Z-axis direction; and calculating the bending angle of the flexible screen based on the acceleration components detected by the at least two accelerometers includes: calculating, based on the acceleration components detected by the first accelerometer and the second accelerometer, the bending angle of the flexible screen by using the following formula:

$$\gamma = \left|\arccos\left(\frac{z2}{\sqrt{x2^2 + y2^2 + z2^2}}\right) - \arccos\left(\frac{z1}{\sqrt{x1^2 + y1^2 + z1^2}}\right)\right|;$$

wherein $\gamma$ represents the bending angle of the flexible screen; x1, y1 and z1 each represent a corresponding acceleration component in X-axis direction, in Y-axis direction, and in Z-axis direction detected by the first accelerometer, and x2, y2 and z2 each represent a corresponding acceleration component in X-axis direction, in Y-axis direction and in Z-axis direction detected by the second accelerometer.

In an alternative embodiment, the at least two accelerometers includes a first accelerometer and a second accelerometer, the specified direction includes a Z-axis direction; and calculating the bending angle of the flexible screen based on the acceleration components detected by the at least two accelerometers includes: calculating, based on the acceleration components detected by the first accelerometer and the second accelerometer, the bending angle of the flexible screen by using the following formula: γ=|arccos(z2/g)−arccos(z1/g)|;

wherein γ represents the bending angle of the flexible screen, z1 represents the acceleration component in Z-axis direction detected by the first accelerometer, and z2 represents the acceleration component in the Z-axis direction detected by the second accelerometer.

In an alternative embodiment, the method further includes: calculating the bending speed of the flexible screen based on a change in the bending angle.

All of the above alternative embodiments can be combined in any form to form optional embodiments of the present disclosure, which will not be described redundantly.

Figure 5:
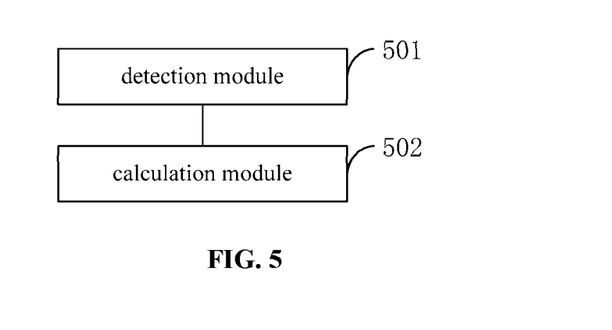
FIG. 5 is a block diagram illustrating a mobile computing device according to an exemplary embodiment.

FIG. 5 is a block diagram illustrating a mobile computing device according to an exemplary embodiment. As shown in FIG. 5, the mobile computing device includes a detection module 501 and a calculation module 502.

The detection module 501 is configured to detect accelerations of the flexible screen by using at least two accelerometers located at different positions on the flexible screen; and the calculation module 502 is configured to calculate the bending angle of the flexible screen based on the accelerations detected by the at least two accelerometers, wherein the bending angle indicates how much the flexible screen is bent. The calculation module 502 can include, for example, a processing unit, a memory, and a communications device of system for reading or receiving acceleration data from the detection module 501.

The mobile computing device disclosed in the present embodiments provides an approach for calculating the bending angle of a flexible screen. By providing at least two accelerometers at different positions on the flexible screen, then detecting accelerations by the at least two accelerometers and calculating the bending angle of the flexible screen by the processing module based on the detected accelerations, it can be easily to determine how much the flexible screen is bent, and upon which a control operation can be performed, which facilitates an easier operation.

In an alternative embodiment, the detection module 501 is configured to detect acceleration components in a specified direction on the flexible screen; and the calculation module 502 is configured to calculate the bending angle of the flexible screen based on the acceleration components detected by the at least two accelerometers.

In an alternative embodiment, the at least two accelerometers includes a first accelerometer and a second accelerometer, and the specified direction includes an X-axis direction, a Y-axis direction and a Z-axis direction; and the calculation module 502 is configured to calculate, based on the acceleration components detected by the first accelerometer and the second accelerometer, the bending angle of the flexible screen by using the following formula:

$$\gamma = \left| \arccos\left(\frac{z2}{\sqrt{x2^2 + y2^2 + z2^2}}\right) - \arccos\left(\frac{z1}{\sqrt{x1^2 + y1^2 + z1^2}}\right) \right|;$$

wherein γ represents the bending angle of the flexible screen; x1, y1 and z1 each represent a corresponding acceleration component in X-axis direction, in Y-axis direction, and in Z-axis direction detected by the first accelerometer, and x2, y2 and z2 each represent a corresponding acceleration component in X-axis direction and in Z-axis direction detected by the second accelerometer.

In an alternative embodiment, the at least two accelerometers includes a first accelerometer and a second accelerometer, and the specified direction includes a Z-axis direction; and the calculation module 502 is configured to calculate, based on the acceleration components detected by the first accelerometer and the second accelerometer, the bending angle of the flexible screen by using the following formula: γ=|arccos(z2/g)−arccos(z1/g)|;

wherein γ represents the bending angle of the flexible screen, z1 represents the acceleration component in Z-axis direction detected by the first accelerometer, and z2 represents the acceleration component in the Z-axis direction detected by the second accelerometer.

In an alternative embodiment, the calculation module 502 is further configured to calculate a bending speed of the flexible screen based on a change in the bending angle and bending time.

The implementation procedures of functions and features of respective modules of the device are same as those in respective steps of the above methods, and thus will be not repeated here.

It should be noted that the mobile computing device provided in the above embodiments is only illustrated by taking the division of above described functional blocks as an example. In practice, the functional assignment may be performed by different functional modules as required, i.e. the internal structure of the mobile computing device is divided into different functional modules to perform all or part of the functions described above. In addition, the mobile computing device provided in the above embodiments follows the same concept as the method embodiments of calculating the bending angle, therefore the detailed implementation of the mobile computing device can be seen in detail in the method embodiments, and will not be described redundantly.

Figure 6:
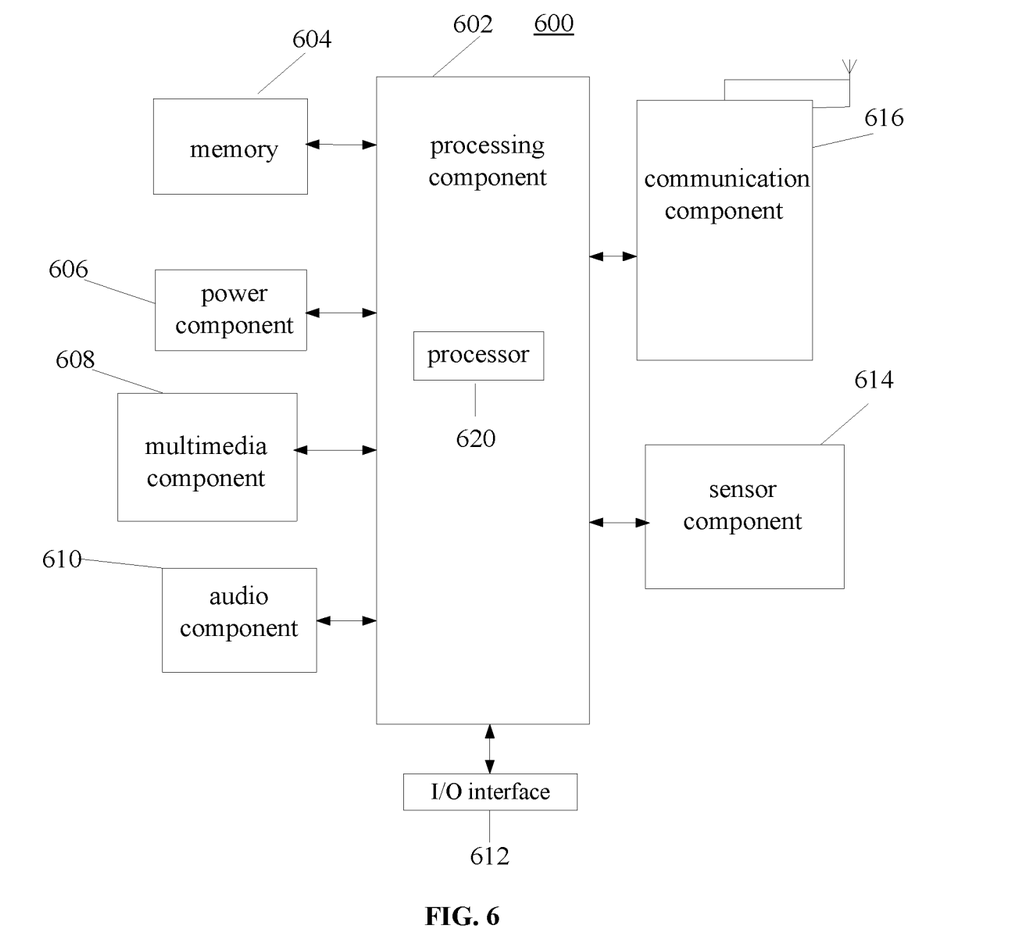
FIG. 6 is a block diagram illustrating a mobile computing device according to an exemplary embodiment.

FIG. 6 is a block diagram illustrating a mobile computing device 600 according to an exemplary embodiment. For example, the device 600 may be a mobile phone, a computer, a digital broadcast computing device, a tablet device, a medical device, a fitness device, a PDA, etc.

Referring to FIG. 6, the device 600 may include one or more of the following components: a processing component 602, a memory 604, an actuator 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data may include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also detect a period of time and a pressure associated with the touch or swipe action. In some embodiments, the multimedia component 608 includes a front camera and/or a rear camera. The front camera and/or the rear camera may receive an external multimedia datum while the device 600 is in an operation mode, such as a photographing mode or a video mode. Each of the front camera and the rear camera may be a fixed optical lens system or have focus and optical zoom capability. In the present embodiments, a mobile computing device 600 includes a flexible screen.

The audio component 610 is configured to output and/or input audio signals. For example, the audio component 610 includes a microphone ("MIC") configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a distance sensor, a pressure sensor, or a temperature sensor. In the present embodiments, at least two accelerometers are located at different locations on the flexible screen for detecting acceleration.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The device 600 may use the circuitries in combination with the other hardware or software components for executing the method above. Each module, submodule, unit, or sub-unit disclosed above may be implemented at least partially using the one or more circuitries.

In exemplary embodiments, there is also provided a non-transitory computer-readable storage medium including instructions, such as the memory 604 including instructions executable by the processor 620 in the device 600 to perform the above-described methods. For example, the non-transitory computer-readable storage medium may be a ROM, a RAM, a CD-ROM, a magnetic tape, a floppy disc, an optical data storage device, and the like.

There is also provided a non-transitory computer-readable storage medium including instructions that, when executed by a processor of the mobile computing device, enables the mobile computing device to perform a method for calculating the bending angle, the method includes: detecting accelerations of the flexible screen by using the at least two accelerometers; calculating the bending angle of the flexible screen based on the accelerations detected by the at least two accelerometers, wherein the bending angle indicates how much the flexible screen is bent.

In an alternative embodiment, the method further includes: detecting acceleration components in a specified direction on the flexible screen; and calculating the bending angle of the flexible screen based on the acceleration components detected by the at least two accelerometers.

In an alternative embodiment, the at least two accelerometers includes a first accelerometer and a second accelerometer, and the specified direction includes an X-axis direction, a Y-axis direction and a Z-axis direction. The calculating the bending angle of the flexible screen based on the acceleration components detected by the at least two accelerometers includes: calculating, based on the acceleration components detected by the first accelerometer and the second accelerometer, the bending angle of the flexible screen by using the following formula:

$$\gamma = \left| \arccos\left(\frac{z2}{\sqrt{x2^2 + y2^2 + z2^2}}\right) - \arccos\left(\frac{z1}{\sqrt{x1^2 + y1^2 + z1^2}}\right) \right|;$$

wherein γ represents the bending angle of the flexible screen; x1, y1 and z1 each represent a corresponding acceleration component in X-axis direction, in Y-axis direction, and in Z-axis direction detected by the first accelerometer, and x2, y2 and z2 each represent a corresponding acceleration component in X-axis direction, in Y-axis direction and in Z-axis direction detected by the second accelerometer.

In an alternative embodiment, the at least two accelerometers includes a first accelerometer and a second accelerometer, and the specified direction includes a Z-axis direction. The calculating the bending angle of the flexible screen based on the acceleration components detected by the at least two accelerometers includes: calculating, based on the acceleration components detected by the first accelerometer and the second accelerometer, the bending angle of the flexible screen by using the following formula: γ=|arccos(z2/g)−arccos(z1/g)|; wherein γ represents the bending angle of the flexible screen, z1 represents the acceleration component in Z-axis direction detected by the first accelerometer, and z2 represents the acceleration component in the Z-axis direction detected by the second accelerometer.

In an alternative embodiment, the method further includes: calculating the bending speed of the flexible screen based on a change in the bending angle.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It should be understood that the disclosure is not limited to the precise structure as described above and shown in the figures, but can have various modification and alternations without departing from the scope of the disclosure. The scope of the disclosure is limited only by the appended claims.

What is claimed is:

1. A mobile computing device, comprising:
   a flexible screen, at least two accelerometers, and a processing module;
   wherein the at least two accelerometers are located at different locations on the flexible screen, and each of the at least two accelerometers is in communication with the processing module;
   the at least two accelerometers are configured to detect accelerations of the flexible screen;
   the processing module is configured to calculate a bending angle of the flexible screen based on the accelerations detected by the at least two accelerometers, wherein the bending angle indicates how much the flexible screen is bent;
   the at least two accelerometers comprise a first accelerometer and a second accelerometer and are configured to detect acceleration components in a specified direction of the flexible screen comprising an X-axis direction, a Y-axis direction and a Z-axis direction; and
   the processing module is configured to calculate, based on acceleration components detected by the first accelerometer and the second accelerometer, the bending angle of the flexible screen by using the following formula:

$$\gamma = \left| \arccos\left(\frac{z2}{\sqrt{x2^2 + y2^2 + z2^2}}\right) - \arccos\left(\frac{z1}{\sqrt{x1^2 + y1^2 + z1^2}}\right) \right|;$$

wherein γ represents the bending angle of the flexible screen; x1, y1 and z1 each represent a corresponding acceleration component in X-axis direction, in Y-axis direction, and in Z-axis direction detected by the first accelerometer, and x2, y2 and z2 each represent a corresponding acceleration component in X-axis direction, in Y-axis direction and in Z-axis direction detected by the second accelerometer.

2. The mobile computing device of claim 1, wherein a distance between any two of the at least two accelerometers is greater than a preset distance.

3. The mobile computing device of claim 1, wherein the at least two accelerometers are further configured to detect acceleration components in a specified direction of the flexible screen comprising the Z-axis direction; and
   the processing module is configured to calculate, based on acceleration components detected by the first accelerometer and the second accelerometer, the bending angle of the flexible screen by using the following formula:

γ=arccos(z2/g)−arccos(z1/g);

wherein γ represents the bending angle of the flexible screen, z1 represents an acceleration component in Z-axis direction detected by the first accelerometer, and z2 represents an acceleration component in the Z-axis direction detected by the second accelerometer.

4. A method for calculating a bending angle, the method is applied on a mobile computing device, and the mobile computing device comprises at least a flexible screen and at least two accelerometers located at different positions on the flexible screen, the method comprising:

detecting accelerations of the flexible screen by using the at least two accelerometers;

calculating the bending angle of the flexible screen based on the accelerations detected by the at least two accelerometers, wherein the bending angle indicates how much the flexible screen is bent, detecting acceleration components in a specified direction of the flexible screen; and calculating the bending angle of the flexible screen based on the acceleration components detected by the at least two accelerometers;

wherein the at least two accelerometers comprise a first accelerometer and a second accelerometer and the specified direction comprises an X-axis direction, a Y-axis direction and a Z-axis direction; and wherein the step of calculating the bending angle of the flexible screen based on the acceleration components detected by the at least two accelerometers comprises:
  calculating, based on acceleration components detected by the first accelerometer and the second accelerometer, the bending angle of the flexible screen by using the following formula:

$$\gamma = \left| \arccos\left( \frac{z2}{\sqrt{x2^2 + y2^2 + z2^2}} \right) - \arccos\left( \frac{z1}{\sqrt{x1^2 + y1^2 + z1^2}} \right) \right|;$$

wherein $\gamma$ represents the bending angle of the flexible screen; x1, y1 and z1 each represent a corresponding acceleration component in X-axis direction, in Y-axis direction, and in Z-axis direction detected by the first accelerometer, and x2, y2 and z2 each represent a corresponding acceleration component in X-axis direction, in Y-axis direction and in Z-axis direction detected by the second accelerometer.

5. The method of claim 4, wherein the at least two accelerometers are further configured to detect acceleration components in a specified direction comprising the Z-axis direction;

wherein the calculating the bending angle of the flexible screen based on the acceleration components detected by the at least two accelerometers comprises:

calculating, based on acceleration components detected by the first accelerometer and the second accelerometer, the bending angle of the flexible screen by using the following formula:

$$\gamma = \arccos(z2/g) - \arccos(z1/g);$$

wherein $\gamma$ represents the bending angle of the flexible screen, z1 represents an acceleration component in Z-axis direction detected by the first accelerometer, and z2 represents an acceleration component in the Z-axis direction detected by the second accelerometer.

6. A non-transitory computer readable medium storing program instructions for causing a processor to execute the steps of a method for calculating a bending angle according to claim 4.

7. A device for computing device calculating a bending angle, comprising:

a flexible screen;

a memory for storing processor-executable instructions;

at least two accelerometers located at offset positions on the flexible screen; and a processor in communication with the memory and the at least two accelerometers;

wherein the processor is configured to: receive acceleration data from the at least two accelerometers; and calculate the bending angle of the flexible screen based on the accelerations detected by the at least two accelerometers, wherein the bending angle indicates how much the flexible screen is bent;

wherein the at least two accelerometers comprise a first accelerometer and a second accelerometer and are configured to detect acceleration components in a specified direction of the flexible screen comprising an X-axis direction, a Y-axis direction and a Z-axis direction; and wherein the processor is configured to: calculate, based on acceleration components detected by the first accelerometer and the second accelerometer, the bending angle of the flexible screen by using the following formula:

$$\gamma = \left| \arccos\left( \frac{z2}{\sqrt{x2^2 + y2^2 + z2^2}} \right) - \arccos\left( \frac{z1}{\sqrt{x1^2 + y1^2 + z1^2}} \right) \right|;$$

wherein $\gamma$ represents the bending angle of the flexible screen; x1, y1 and z1 each represent a corresponding acceleration component in X-axis direction, in Y-axis direction, and in Z-axis direction detected by the first accelerometer, and x2, y2 and z2 each represent a corresponding acceleration component in X-axis direction, in Y-axis direction and in Z-axis direction detected by the second accelerometer.

* * * * *